US012082745B2

(12) United States Patent
Deng et al.

(10) Patent No.: US 12,082,745 B2
(45) Date of Patent: Sep. 10, 2024

(54) NON-CONTACT MAGNETIC COUPLER FOR FOOD PROCESSING APPLIANCE HAVING SMALL BRUSHLESS PERMANENT MAGNET MOTOR

(71) Applicant: WHIRLPOOL CORPORATION, Benton Harbor, MI (US)

(72) Inventors: Fang Deng, Novi, MI (US); Cheng Gong, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 17/718,408

(22) Filed: Apr. 12, 2022

(65) Prior Publication Data
US 2022/0233025 A1 Jul. 28, 2022

Related U.S. Application Data

(63) Continuation of application No. 16/675,502, filed on Nov. 6, 2019, now Pat. No. 11,330,938.

(51) Int. Cl.
*A47J 43/046* (2006.01)
*A47J 43/08* (2006.01)

(52) U.S. Cl.
CPC ......... *A47J 43/0465* (2013.01); *A47J 43/085* (2013.01)

(58) Field of Classification Search
CPC .................................................. A47J 43/0465
USPC .......................... 366/273, 274; 310/103, 104
See application file for complete search history.

(56) References Cited

U.S. PATENT DOCUMENTS

| 1,420,773 | A |   | 6/1922  | Stainbrook        |              |
|-----------|---|---|---------|-------------------|--------------|
| 2,705,762 | A | * | 4/1955  | Pile ............. | H02K 49/106  |
|           |   |   |         |                   | 310/104      |
| 5,478,149 | A | * | 12/1995 | Quigg ............ | B01F 35/4112 |
|           |   |   |         |                   | 366/314      |
| 6,336,603 | B1|   | 1/2002  | Karkos, Jr. et al.|              |
| 6,467,944 | B2| * | 10/2002 | Ugolini .......... | A23G 9/045   |
|           |   |   |         |                   | 366/144      |
| 7,112,904 | B2| * | 9/2006  | Akiyama ......... | F27B 14/061  |
|           |   |   |         |                   | 366/605      |
| 7,380,974 | B2| * | 6/2008  | Tessien .......... | B01J 19/008  |
|           |   |   |         |                   | 95/266       |
| 7,396,153 | B2|   | 7/2008  | Andersson         |              |
| 7,547,135 | B2|   | 6/2009  | Kocienski         |              |

(Continued)

FOREIGN PATENT DOCUMENTS

CN 204928523 12/2015
GB 622115 4/1949
(Continued)

*Primary Examiner* — David L Sorkin
(74) *Attorney, Agent, or Firm* — Price Heneveld LLP

(57) ABSTRACT

A food processing appliance includes a container having a rotational processing assembly that includes an inner portion of a magnetic coupler. A base has a drive system for providing a rotational drive force. A drive rotor selectively transfers the rotational drive force to the magnetic coupler. The drive rotor includes a plurality of drive-magnetic members that form an outer portion of the magnetic coupler. The inner portion and outer portions of the magnetic coupler selectively and magnetically engage to form an engaged position. The engaged position is further defined by the inner portion being completely separated from the outer portion to define a gap therebetween.

9 Claims, 16 Drawing Sheets

(56) References Cited

U.S. PATENT DOCUMENTS

| | | |
|---|---|---|
| 7,911,107 B2 | 3/2011 | Nashiki |
| 8,282,268 B2 | 10/2012 | Karkos, Jr. et al. |
| 8,421,293 B2 | 4/2013 | Yamashita |
| 9,801,500 B2 | 10/2017 | Ven Der Woning |
| 9,833,757 B2 | 12/2017 | Johansson |
| 9,841,025 B2 | 12/2017 | Mischiatti et al. |
| 10,335,750 B2 | 7/2019 | Atalla et al. |
| 10,583,409 B2 | 3/2020 | Atalla et al. |
| 11,330,938 B2* | 5/2022 | Deng ................ A47J 43/085 |
| 2002/0163855 A1* | 11/2002 | Beebe ................ B01F 29/64 |
| | | 366/244 |
| 2002/0180294 A1 | 12/2002 | Kaneda et al. |
| 2002/0180295 A1 | 12/2002 | Kaneda et al. |
| 2003/0197080 A1 | 10/2003 | Karkos, Jr. et al. |
| 2004/0066107 A1* | 4/2004 | Gery ................ H02K 49/106 |
| | | 310/114 |
| 2004/0076076 A1* | 4/2004 | Hoobyar ............ B01F 33/453 |
| | | 366/273 |
| 2005/0073212 A1 | 4/2005 | Semones et al. |
| 2006/0221765 A1* | 10/2006 | Andersson ............ F16C 17/02 |
| | | 366/273 |
| 2007/0286015 A1 | 12/2007 | Markle |
| 2008/0224557 A1 | 9/2008 | Cleveland |
| 2011/0121675 A1 | 5/2011 | Yamashita |
| 2011/0283897 A1 | 11/2011 | Fang et al. |
| 2012/0080977 A1 | 4/2012 | Kusase |
| 2013/0069467 A1 | 3/2013 | Smith et al. |
| 2013/0113317 A1* | 5/2013 | Englert ................ H02K 49/102 |
| | | 310/103 |
| 2013/0270945 A1 | 10/2013 | Ziegler et al. |
| 2016/0156257 A1* | 6/2016 | Atkins ................ H02K 49/102 |
| | | 310/74 |
| 2018/0219459 A1 | 8/2018 | Chahine et al. |
| 2018/0236413 A1 | 8/2018 | Tran et al. |
| 2019/0011019 A1 | 1/2019 | Huerta-Ochoa |
| 2019/0238043 A1 | 8/2019 | Kao |
| 2019/0313856 A1 | 10/2019 | Tareen et al. |
| 2019/0356194 A1 | 11/2019 | Post et al. |
| 2020/0067357 A1 | 2/2020 | Post et al. |
| 2020/0204016 A1 | 6/2020 | Yan et al. |
| 2021/0091608 A1 | 3/2021 | Hull |
| 2021/0127902 A1 | 5/2021 | Deng et al. |
| 2021/0135523 A1 | 5/2021 | Yan et al. |
| 2021/0152063 A1 | 5/2021 | Brahmavar |

FOREIGN PATENT DOCUMENTS

| | | |
|---|---|---|
| WO | 2018075918 | 4/2018 |
| WO | 2019169828 | 9/2019 |

* cited by examiner

NON-CONTACT MAGNETIC COUPLER FOR FOOD PROCESSING APPLIANCE HAVING SMALL BRUSHLESS PERMANENT MAGNET MOTOR

CROSS-REFERENCE TO RELATED APPLICATION

The present application is a continuation of U.S. patent application Ser. No. 16/675,502 filed Nov. 6, 2019, now U.S. Pat. No. 11,330,938, entitled NON-CONTACT MAGNETIC COUPLER FOR FOOD PROCESSING APPLIANCE HAVING SMALL BRUSHLESS PERMANENT MAGNET MOTOR, the entire disclosure of which is hereby incorporated herein by reference.

FIELD OF THE DEVICE

The device is in the field of food processing appliances, and more specifically, a food processing appliance that incorporates a small brushless permanent magnet motor and a magnetic coupler that attaches the drive system to a processing tool in a non-contact configuration.

SUMMARY OF THE DISCLOSURE

According to one aspect of the present disclosure, a food processing appliance includes a container having a rotational processing assembly that includes a follower rotor having a first magnetic feature. A base has a drive system for providing a rotational drive force. A magnetic coupler has a drive rotor that selectively transfers the rotational drive force to the follower rotor. The drive rotor includes a plurality of drive-magnetic members that form a generally cylindrical space that receives and surrounds the follower rotor in an engaged position. At least one of the drive and follower rotors includes a magnet configuration that directs a respective magnetic field in a direction of a gap defined between the drive and follower rotors.

According to another aspect of the present disclosure, a food processing appliance includes a container having a rotational processing assembly that includes an inner portion of a magnetic coupler. A base has a drive system for providing a rotational drive force. A drive rotor selectively transfers the rotational drive force to the magnetic coupler. The drive rotor includes a plurality of drive-magnetic members that form an outer portion of the magnetic coupler. The inner portion and outer portions of the magnetic coupler selectively and magnetically engage to form an engaged position. The engaged position is further defined by the inner portion being completely separated from the outer portion to define a gap therebetween.

According to yet another aspect of the present disclosure, a food processing appliance includes a base having a drive system for providing a rotational drive force. A drive rotor selectively transfers the rotational drive force to an outer portion of a magnetic coupler. The drive rotor includes a plurality of drive-magnetic members that form a cylindrical coupling space of the magnetic coupler. A container has a rotational processing assembly that includes an inner portion of the magnetic coupler. The inner portion selectively couples with the outer portion within the cylindrical coupling space to define an engaged position with a continuous gap extending between the inner and outer portions. The outer portion of the magnetic coupler includes a plurality of magnets that are oriented in a Halbach configuration that magnetically engages with the inner portion within the gap.

These and other features, advantages, and objects of the present disclosure will be further understood and appreciated by those skilled in the art by reference to the following specification, claims, and appended drawings.

Figure 1:
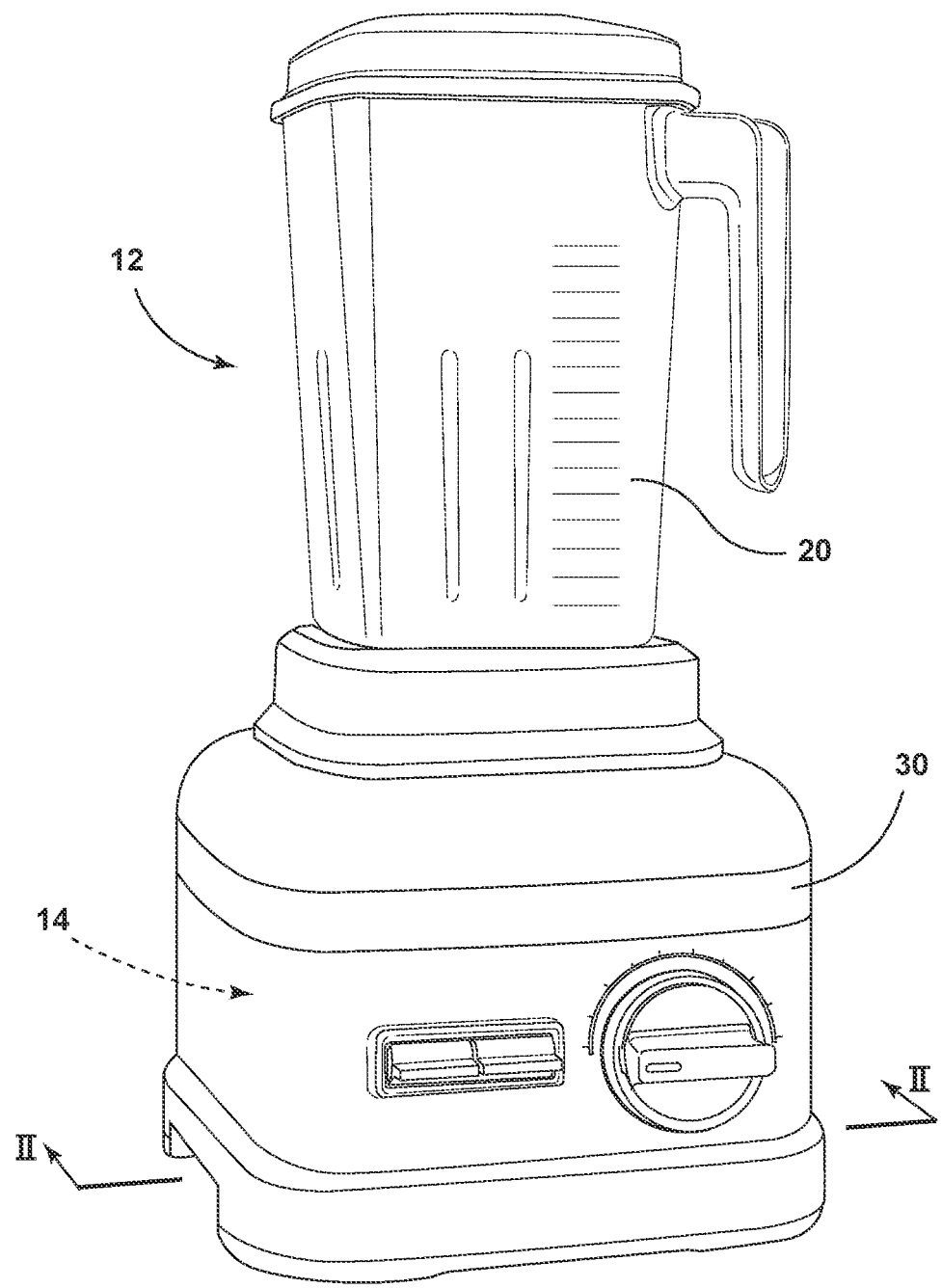
FIG. 1 is a front perspective view of a food processing appliance that incorporates an aspect of the magnetic coupler.

The components in the figures are not necessarily to scale, emphasis instead being placed upon illustrating the principles described herein.

DETAILED DESCRIPTION

The present illustrated embodiments reside primarily in combinations of method steps and apparatus components related to a non-contact magnetic coupler for a food processing appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

With respect to FIGS. 1-6, reference numeral 10 generally refers to a magnetic coupler for a food processing appliance 12. The food processing appliance 12 includes a motor 14 that operates to transfer a drive force 16 to a processing tool 18 located within a container 20. The food processing appliances 12 in this regard can include, but are not limited to, blenders, multi-function processors, mixers and other similar small appliances that may include a removable container 20 having a processing tool 18 that can be attached to a base 30 that includes a motor 14. According to various aspects of the device, the motor 14 for the food processing appliance 12 can include a brushless permanent magnet motor 14 (BPM motor). As exemplified within various aspects of the device, a small brushless permanent magnet motor 22 (SBPM motor) is utilized within the food processing appliance 12 due to the small size and compact nature of the appliance 12 that is typically placed upon a countertop and stored within various locations of a residential or commercial structure.

As exemplified in FIGS. 1-6, the food processing appliance 12 includes a container 20 having a rotational processing assembly 24 that includes a follower rotor 26 having a first magnetic feature 28. The food processing appliance 12 also includes a base 30 having a drive system 32 for providing a rotational drive force 16. As discussed above, this drive system 32 typically includes a direct drive SBPM motor 22 having a stator 34 that rotationally operates a rotor 36 having a drive shaft 38. The magnetic coupler 10 includes a drive rotor 40 that selectively transfers the rotational drive force 16 from the drive system 32 to the follower rotor 26. The drive rotor 40 includes a plurality of drive-magnetic members 42 that form a coupling space, typically a generally cylindrical space 44. This cylindrical space 44 is configured to receive and surround the follower rotor 26 in an engaged position 46 of the container 20. At least one of the drive and follower rotors 40, 26 includes a magnet configuration that directs respective inner and outer magnetic fields 48, 50 in the direction of a gap 52 defined between the drive and follower rotors 40, 26 when in the engaged position 46.

Referring again to FIGS. 1-6, the magnetic coupler 10, when in the engaged position 46, can define an inner portion 60 that is indicative of the follower rotor 26 and an outer portion 62 that is indicative of the drive rotor 40. The drive rotor 40 is typically coupled with the drive shaft 38 such that when the drive system 32 is activated, the direct drive motor 14 rotates the drive shaft 38, and, in turn, the drive rotor 40 for the magnetic coupler 10. The follower rotor 26 is placed within the cylindrical space 44 defined by the drive rotor 40. Each of the drive rotor 40 and the follower rotor 26 include cooperative magnetic features 54 that typically form a plurality of respective inner and outer magnetic fields 48, 50 that retain the follower rotor 26 in a rotational alignment with the drive rotor 40. These inner and outer magnetic fields 48, 50 maintain the rotational alignment between the follower rotor 26 and the drive rotor 40, as the drive rotor 40 rotates about a rotational axis 64. This magnetic interaction between the inner and outer portions 60, 62 of the magnetic coupler 10 is accomplished in a non-contact configuration. Stated another way, the magnetic features 54 of the inner portion 60 of the magnetic coupler 10, which form the follower rotor 26, are free of direct contact with the magnetic features 54 of the outer portion 62 of the magnetic coupler 10 that form the drive rotor 40. It should be understood that magnetic features 54 can include magnetic members, ferromagnetic members 122 or a combination thereof to produce a magnetic and/or reluctance-type magnetic coupler 10.

In order to foster the rotational alignment between the inner and outer portions 60, 62 of the magnetic coupler 10, the magnetic features 54 of the follower rotor 26 can include a plurality of follower magnets 70 that are configured to electromagnetically interact with the plurality of drive-magnetic members 42. As exemplified in FIG. 6, the various follower magnets 70 and the drive-magnetic members 42 are oriented within the inner and outer portions 60, 62 of the magnetic coupler 10, respectively, to direct the inner magnetic fields 48 of the follower rotor 26 and an outer magnetic field 50 of the drive rotor 40 toward one another and into the gap 52 defined between the drive and follower rotors 40, 26. This interaction produces a flux path 124 that extends between the inner and outer portions 60, 62 of the magnetic coupler 10 and extends across the gap 52. The interaction of the inner and outer magnetic fields 48, 50 and the resulting generation of the flux path 124 that extends across the gap 52 produces a torque retention force 100 that maintains the rotational alignment between the follower rotor 26 and the drive rotor 40.

Referring again to FIGS. 2-6, to direct the inner and outer magnetic fields 48, 50 toward the gap 52, the follower magnets 70 and the drive-magnetic members 42 of the inner and outer portions 60, 62 of the magnetic coupler 10 are arranged into a Halbach array or Halbach configuration 80. The magnetic poles 82 of the follower magnets 70 with respect to the inner portion 60 of the magnetic coupler 10 are positioned in alternating and generally perpendicular configurations about the rotational axis 64 of the follower rotor 26. These pole orientations of the various follower magnets 70 cooperate with one another to minimize the inner magnetic field 48 in the direction of the idler shaft 84 that drives the processing tool 18. Additionally, the configuration of the magnetic poles 82 of the follower magnets 70 increases the magnetic field in the direction of the gap 52 defined between the follower rotor 26 and the drive rotor 40. Similarly, the configuration of the various magnetic poles 82 of the drive-magnetic members 42 are positioned such that their magnetic poles 82 are positioned in alternating and generally perpendicular orientations with respect to adjacent magnets of the drive-magnetic members 42. As with the inner portion 60 of the magnetic coupler 10, the magnet configuration of the drive-magnetic members 42 minimizes the outer magnetic field 50 outside of the outer portion 62 of the magnetic coupler 10 and magnifies or increases the magnetic field in the direction of the gap 52 defined between the inner and outer portions 60, 62 of the magnetic coupler 10. This intensification of the inner and outer magnetic fields 48, 50 within the gap 52 defined between the inner and outer portions 60, 62 also intensifies the magnetic connection between the follower rotor 26 and the drive rotor 40. In turn, this intensified magnetic connection allows the follower rotor 26 to more closely follow and remain in rotational alignment with the drive rotor 40 during operation of the direct drive motor 14 of the base 30 for the food processing appliance 12.

Figure 6:
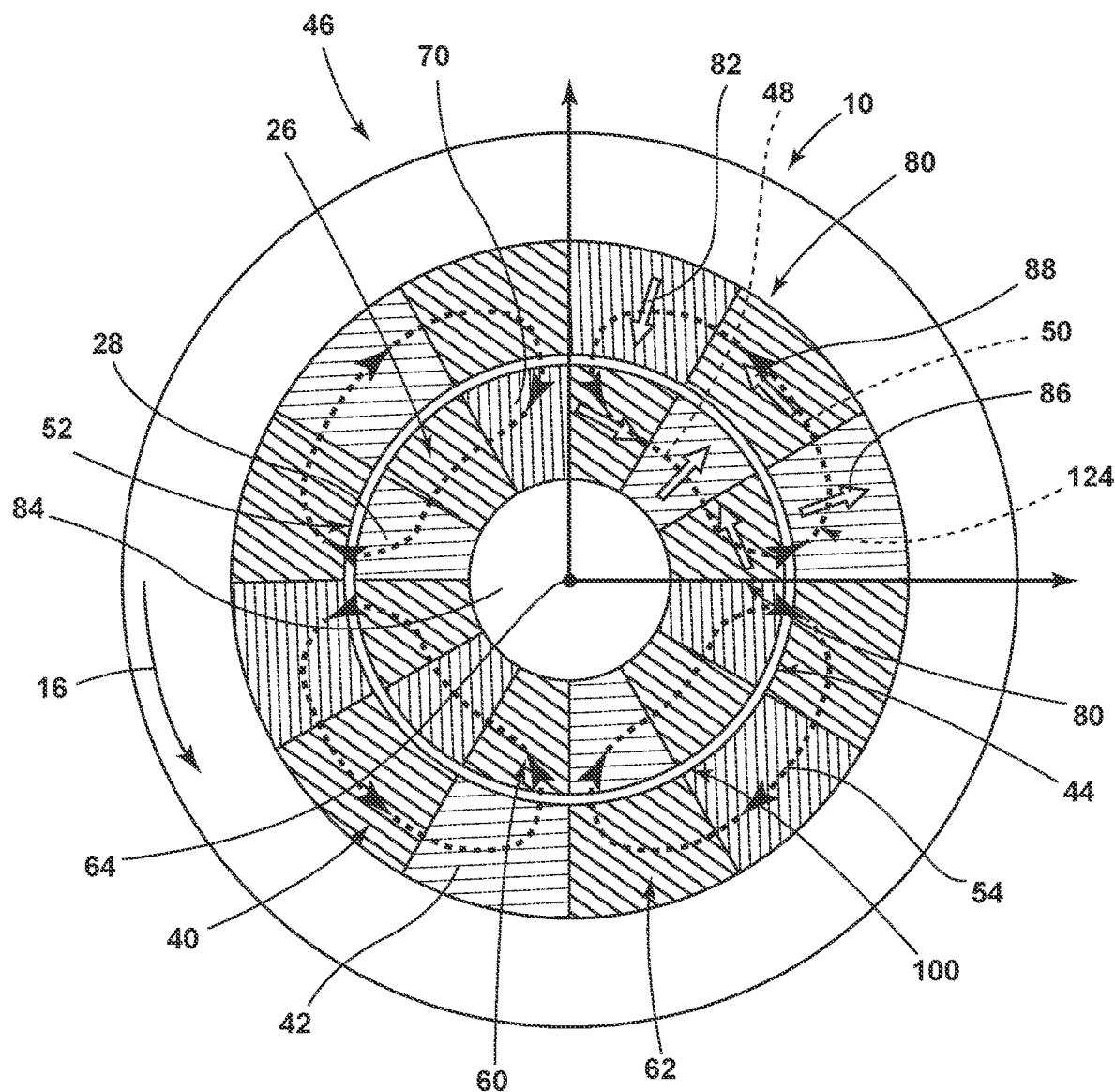
FIG. 6 is a lateral cross-sectional view of an aspect of the magnetic coupler for the food processing appliance and showing the orientation of individual magnets within each of the inner and outer portions of the magnetic coupler.
Figure 7:
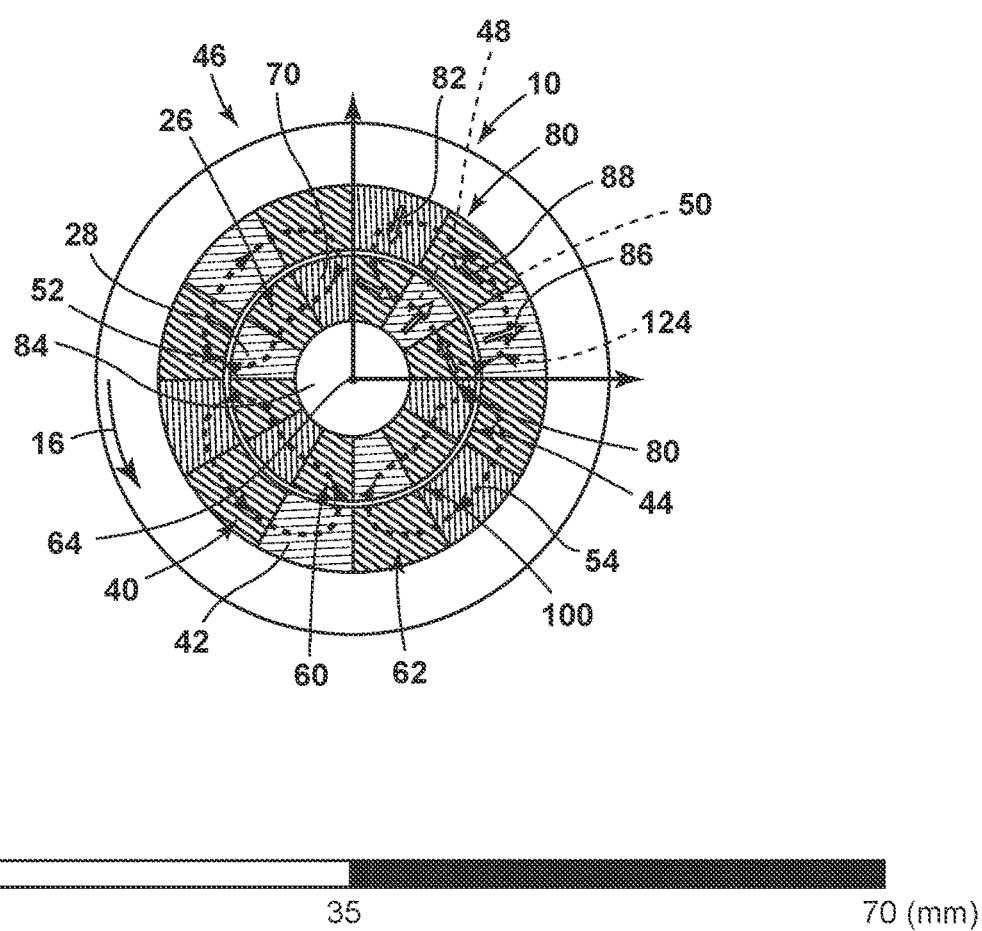
FIG. 7 is a schematic cross-sectional view of a compact aspect of the magnetic coupler.
Figure 8:
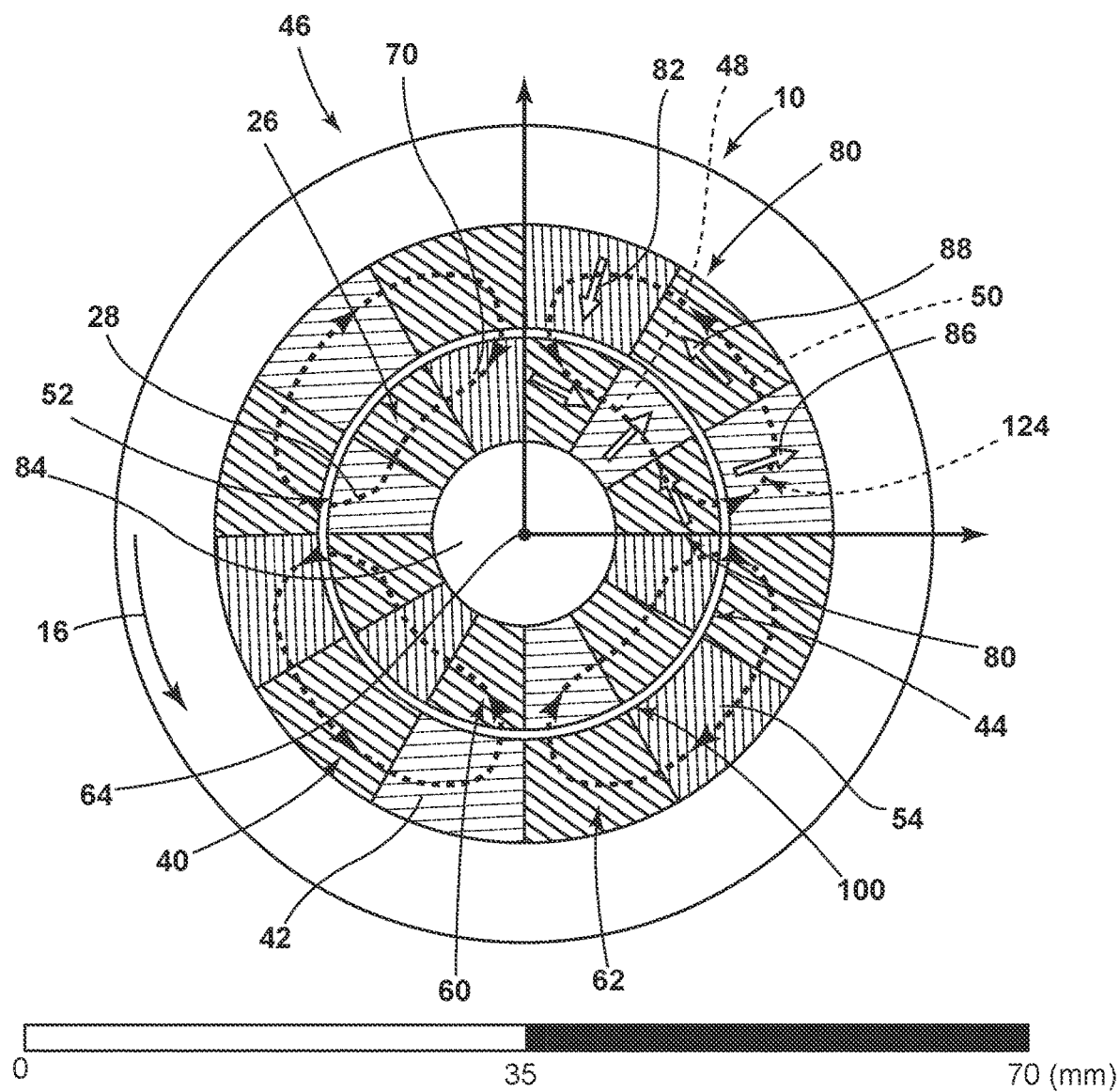
FIG. 8 is a schematic cross-sectional view of an intermediate sized aspect of a magnetic coupler.
Figure 9:
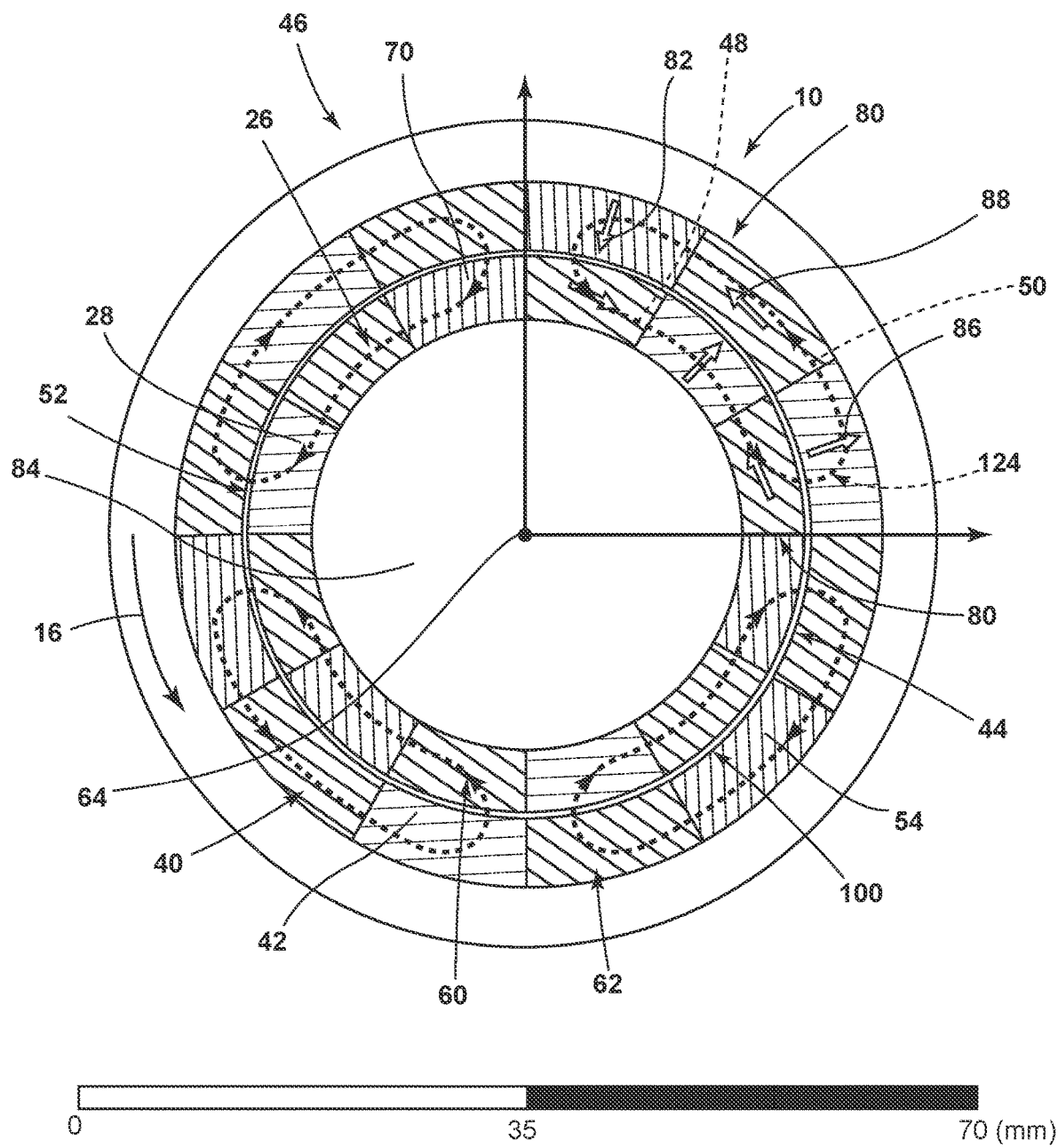
FIG. 9 is a schematic cross-sectional view of a large aspect of the magnetic coupler.
Figure 10:
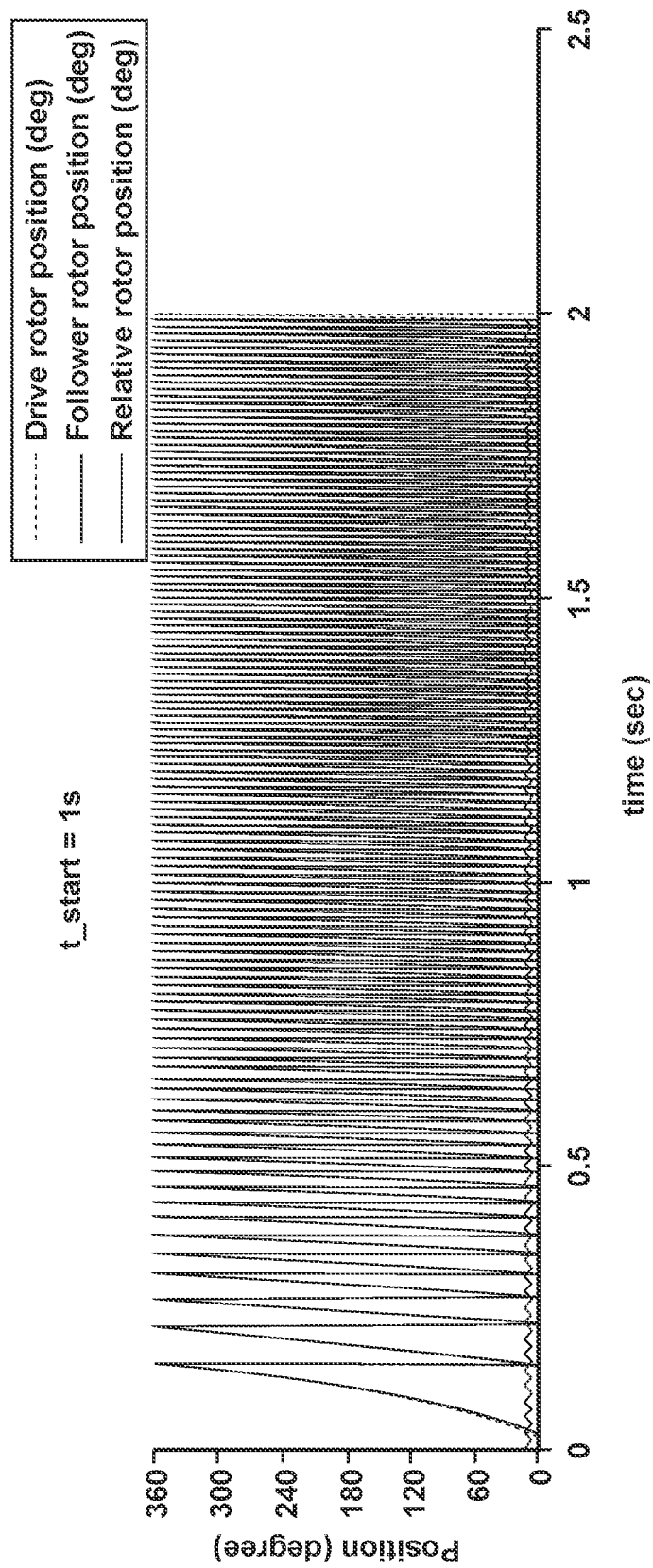
FIG. 10 is a schematic graph illustrating operation of the magnetic coupler during operation of the small brushless permanent magnet motor of the food processing appliance.
Figure 11:
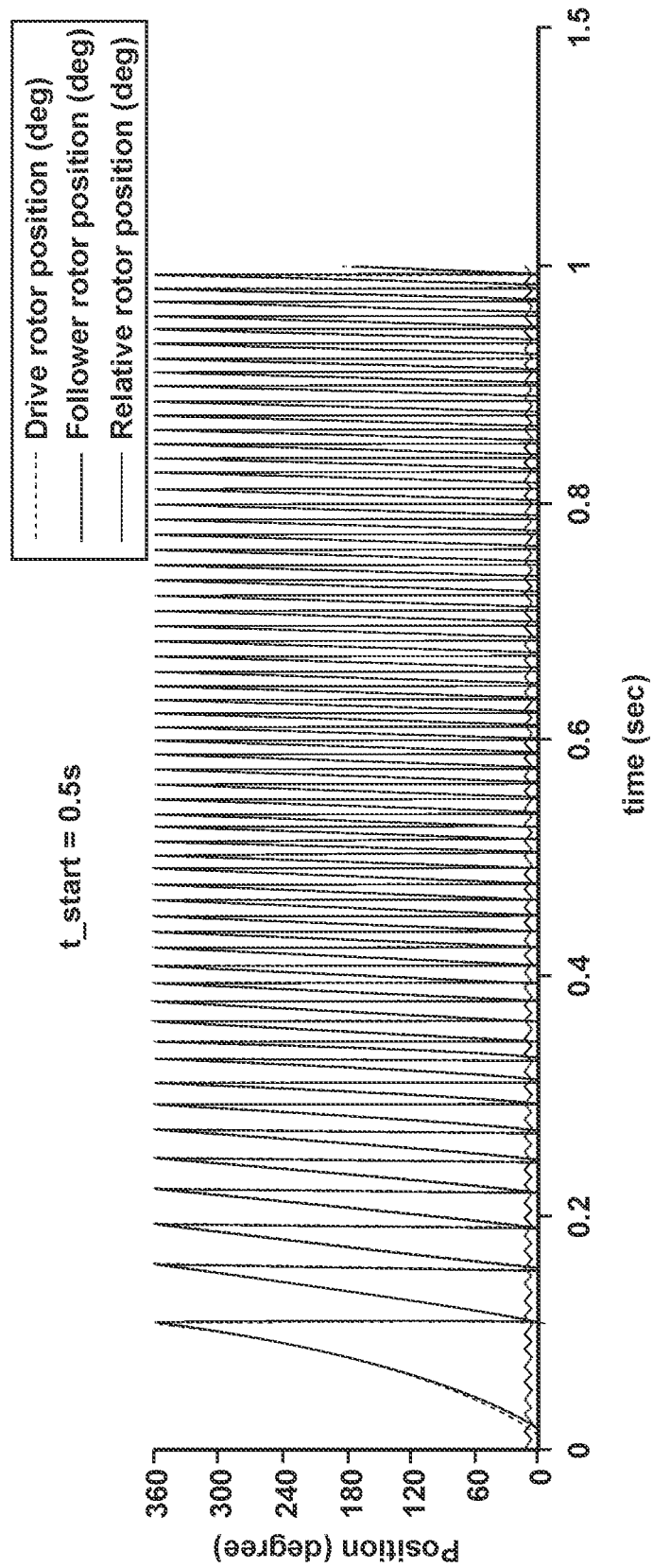
FIG. 11 is an enlarged representation of the graph of FIG. 10 and showing the first second of operation of the magnetic coupler.

As exemplified in FIG. 6, typically, the Halbach configuration 80 for the follower magnets 70 and the drive-magnetic members 42 is oriented such that the magnetic features 54 alternate the direction of the magnetic pole 82 of each magnetic feature 54 to be radially inward or outward from a central axis of the follower rotor 26 and tangential with respect to a circle extending around the rotational axis 64. This alternation of radially aligned poles 86 radial and tangentially aligned poles 88 extends around each of the follower rotor 26 and the drive rotor 40. Additionally, this orientation alternates with respect to the drive and follower rotors 40, 26. Through this configuration, a follower magnet 70 having a tangentially aligned pole 88 is typically, radially, aligned with a drive-magnetic member 42 having a radially aligned pole 86. Because the number of drive-magnetic members 42 and the number of follower magnets 70 is equal, this alternating radial alignment is maintained throughout the magnetic coupler 10. This configuration tends to align opposing polarities of the inner and outer magnetic fields 48, 50 at their strongest locations. As a consequence, this alignment strengthens the magnetic bond between the follower rotor 26 and the drive rotor 40 to maintain the rotational alignment between these two inner and outer portions 60, 62 of the magnetic coupler 10.

As exemplified in FIGS. 1-9, because of the Halbach configuration 80 of each of the drive and follower rotors 40, 26, the use of a back iron 170 (shown in FIGS. 15 and 16) is typically not necessary. The configuration of the magnetic features 54 within each of the inner and outer portions 60, 62 of the magnetic coupler 10 serves to direct the inner and outer magnetic fields 48, 50 toward the gap 52. Accordingly, the use of a back iron is not needed for generating this augmentation of the inner and outer magnetic fields 48, 50. By eliminating this back iron within the configuration of the inner and outer portions 60, 62 of the magnetic coupler 10, the overall size of the magnetic coupler 10 can be decreased without sacrificing the coupling strength between the follower rotor 26 and the drive rotor 40 of the magnetic coupler 10.

Referring now to FIGS. 6-13, during operation of the food processing appliance 12, the SBPM motor 22 is activated and the drive shaft 38 operates the drive rotor 40 about the rotational axis 64. Because of the magnetic connection between the follower rotor 26 and the drive rotor 40, the follower rotor 26 maintains a close rotational alignment with the drive rotor 40.

As exemplified in FIGS. 10-13, this close alignment between the rotational position of the follower rotor 26 with respect to the drive rotor 40 is exemplified during operation of the SBPM motor 22. As the drive rotor 40 rotates about the rotational axis 64, the relative rotor position between the inner and outer portions 60, 62 of the magnetic coupler 10 remains slight. This is indicative of a strong torque-retention force 100 between the follower rotor 26 and the drive rotor 40. This torque-retention force 100 is needed not just to maintain the rotational position of the follower rotor 26 with respect to the drive rotor 40, but also to account for the progressing resistance experienced by the processing tool 18 during operation of the food processing appliance 12. The torque-retention force 100 that holds the follower rotor 26 in rotational alignment with the drive rotor 40 also assists in consistently transferring the drive force 16 to the processing tool 18 for processing various food items, without slippage or other loss of torque. Accordingly, the drive force 16 generated by the SBPM motor 22 is transferred to the drive rotor 40. This drive force 16 is then transferred to the follower rotor 26 via the torque-retention force 100 generated by the follower magnets 70 and the drive-magnetic members 42 of the drive rotor 40. This torque-retention force 100 maintains the rotational alignment with the follower rotor 26 with the drive rotor 40 to power the processing tool 18 within the processing space of the container 20. As discussed above, the use of the Halbach configuration 80 of the magnets for the inner and outer portions 60, 62 of the magnetic coupler 10 helps to strengthen the torque-retention force 100 that maintains the rotational alignment with the inner and outer portions 60, 62 of the magnetic coupler 10.

Figure 12:
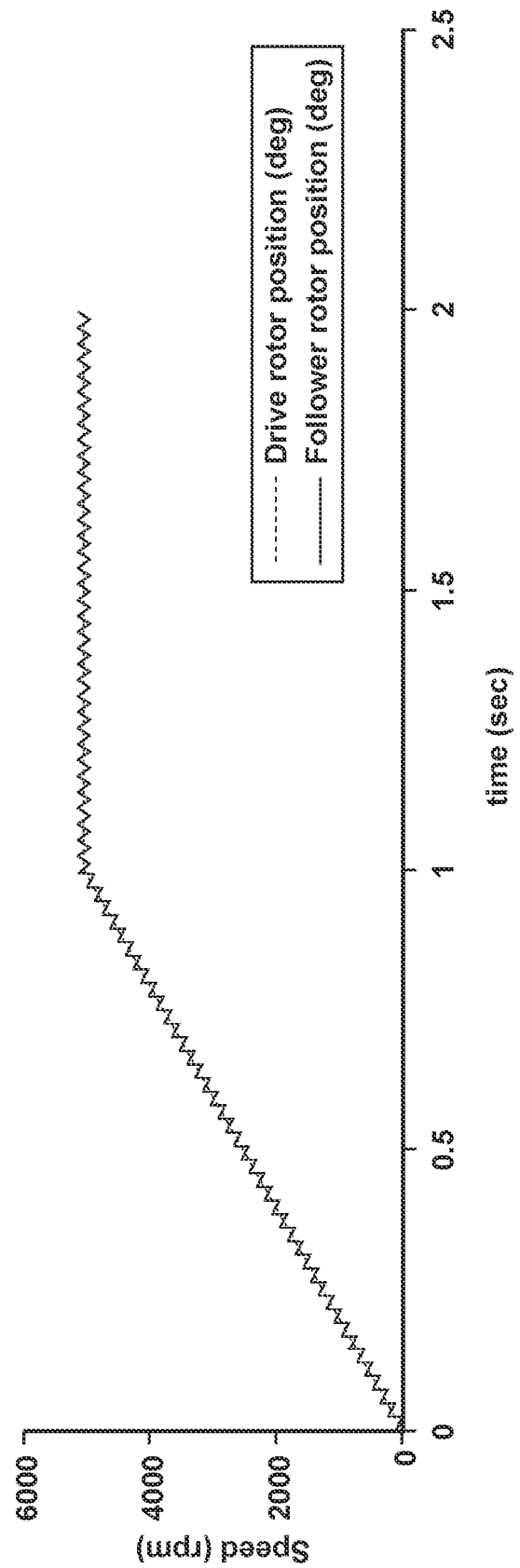
FIG. 12 is a schematic graph illustrating positions of the magnetic coupler in relation to the acceleration and speed of the small brushless permanent magnet motor.
Figure 13:
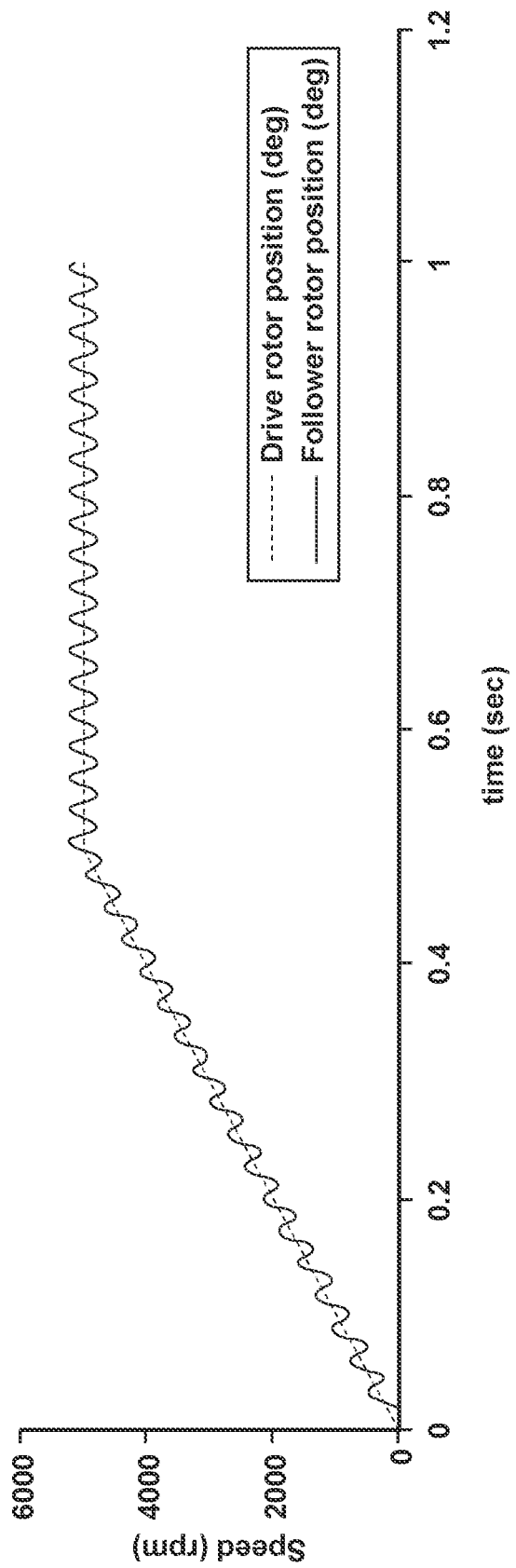
FIG. 13 is an enlarged representation of the graph of FIG. 12 showing only the first second of operation of the small brushless permanent magnet motor.

As exemplified in FIGS. 12 and 13, this close rotational alignment between the inner and outer portions 60, 62 of the magnetic coupler 10 remains consistent during the acceleration of the SBPM motor 22 from 0 rpm to approximately 5,000 rpm, typically in less than one second. Accordingly, the torque-retention force 100 experienced between the inner and outer portions 60, 62 of the magnetic coupler 10 is typically stronger than any friction experienced by the processing tool 18 during operation of the food processing appliance 12.

Referring again to FIGS. 1-9, the food processing appliances 12 includes a container 20 that has a rotational processing assembly 24 that includes the inner portion 60 of the magnetic coupler 10. The base 30 includes the drive system 32 for providing the rotational drive force 16. The drive rotor 40 selectively transfers the rotational drive force 16 from the drive system 32 to the magnetic coupler 10. The drive rotor 40 includes the plurality of drive-magnetic members 42 that form the outer portion 62 of the magnetic coupler 10. The inner and outer portions 60, 62 of the magnetic coupler 10 selectively and magnetically engage to form an engaged position 46, where the inner and outer portions 60, 62 cooperatively operate to define the torque-retention force 100 that maintains the rotational alignment with the inner portion 60 of the magnetic coupler 10 with respect to the outer portion 62 of the magnetic coupler 10. The engaged position 46 of the magnetic coupler 10 is further defined by the inner portion 60 being completely separated from the outer portion 62 to define a gap 52 therebetween.

As exemplified in FIGS. 3-6, the outer portion 62 of the magnetic coupler 10 defines an outer magnetic field 50 that is directed toward the gap 52 in a manner that is free of a back iron. As discussed above, the use of the drive-magnetic members 42 that are oriented within the Halbach configuration 80 does not require the use of a back iron such that the thickness of the inner and outer portions 60, 62 of the magnetic coupler 10, and the magnetic coupler 10 as a whole, can be made much smaller.

It is contemplated that the magnetic coupler 10 can include a plurality of permanent magnets that make up the drive-magnetic members 42. Similarly, the inner portion 60 of the magnetic coupler 10 can include follower magnets 70 that are in the form of permanent magnets. As discussed above, the various permanent magnets of the inner and outer portions 60, 62 of the magnetic coupler 10 can be configured in the Halbach configuration 80 described herein. This Halbach configuration 80 of the various permanent magnets directs the inner and outer magnetic fields 48, 50 towards the gaps 52 defined between the inner and outer portions 60, 62 of the magnetic coupler 10. As discussed above, the use of the Halbach configuration 80 strengthens the torque-retention force 100 experienced between the inner and outer portions 60, 62 of the magnetic coupler 10 and within the gap 52 defined therebetween. It is contemplated that the various magnets of the inner and outer portions 60, 62 of the magnetic coupler 10 can include bonded neodymium, bonded and sintered neodymium, ferrite, alnico, SmCo, combinations thereof, and other similar magnetic materials.

As exemplified in FIGS. 1-9, the food processing appliance 12 can include the base 30 that includes the drive system 32 that provides a rotational drive force 16. The drive rotor 40 selectively transfers the rotational drive force 16 to an outer portion 62 of the magnetic coupler 10. The drive rotor 40 includes the plurality of drive-magnetic members 42 that form a cylindrical space 44 of the magnetic coupler 10 that couples the follower rotor 26 to the drive rotor 40. The container 20 includes a rotational processing assembly 24 having the processing tool 18 and the inner portion 60 of the magnetic coupler 10. The inner portion 60 of the magnetic coupler 10 selectively couples with the outer portion 62 within the cylindrical space 44 to define the engaged position 46 with a continuous gap 52 extending between the inner and outer portions 60, 62 of the magnetic coupler 10. According to various aspects of the device, one of the inner and outer portions 60, 62 of the magnetic coupler 10 can include a plurality of magnetic features 54 that are oriented in the Halbach configuration 80. As discussed above, this Halbach configuration 80 of the plurality of magnetic features 54 magnetically engages with the other of the inner and outer portions 60, 62 of the magnetic coupler 10 within the gap 52.

Figure 2:
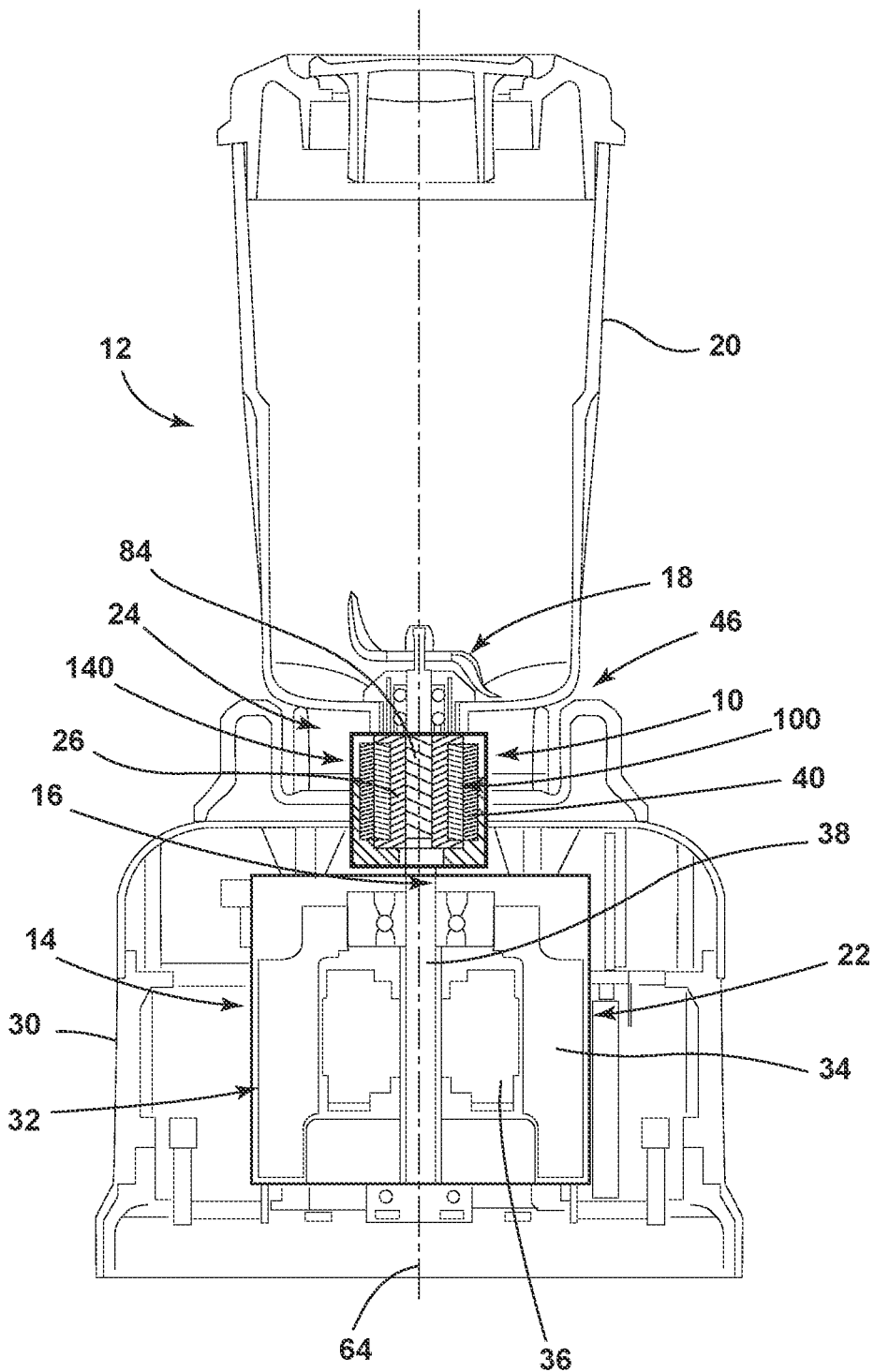
FIG. 2 is a cross-sectional view of the appliance of FIG. 1 taken along line II-II.
Figure 14:
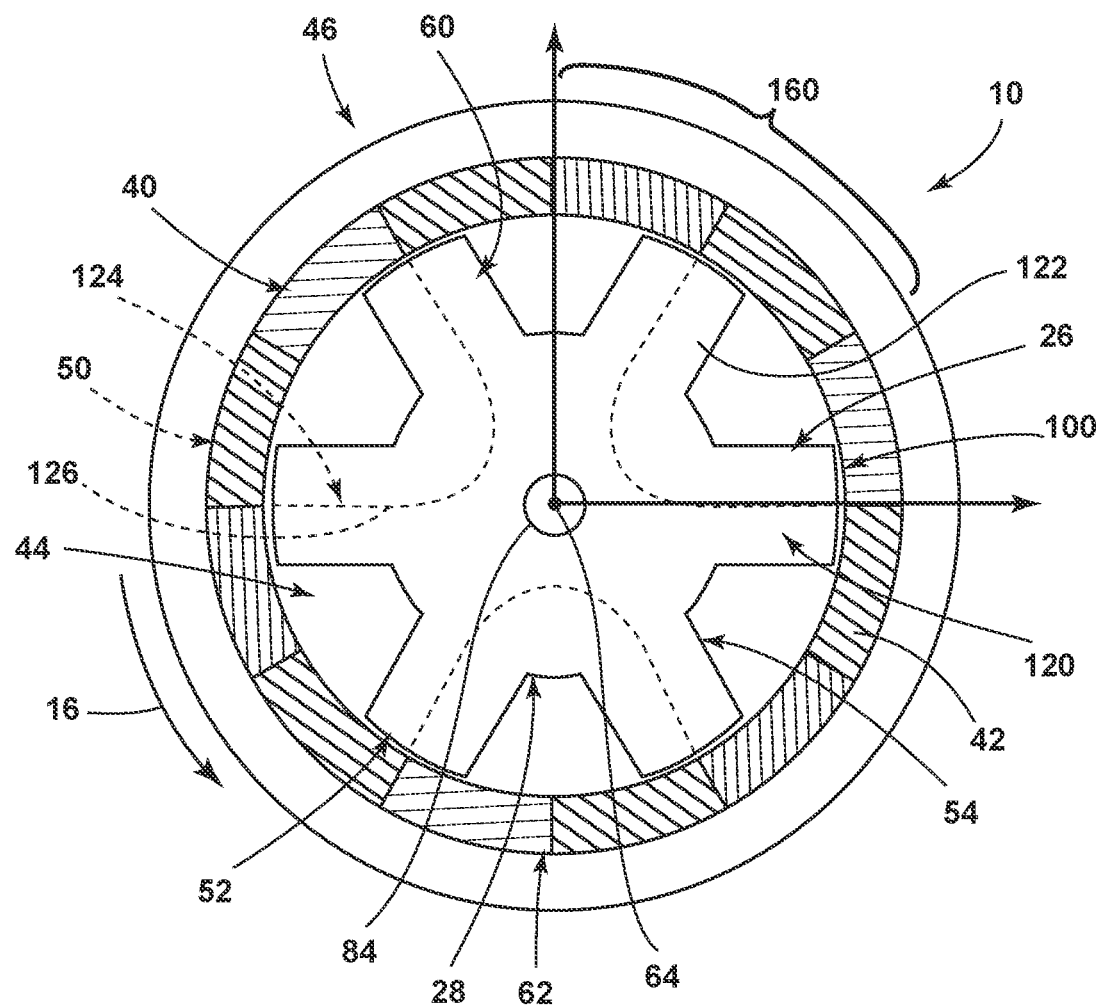
FIG. 14 is a schematic cross-sectional view of an aspect of the magnetic coupler incorporating a reluctance mechanism.

As exemplified in FIGS. 1, 2 and 14, it is contemplated that the magnetic coupler 10 can include a reluctance mechanism 120. This reluctance mechanism 120 can be in the form of a ferromagnetic member 122 that defines one of the inner and outer portions 60, 62 of the magnetic coupler 10. As exemplified in FIG. 14, the inner portion 60 of the magnetic coupler 10 includes the ferromagnetic member 122. During operation of the SBPM motor 22, the rotor 36 of the SBPM motor 22 drives the drive shaft 38 and rotates the outer portion 62 of the magnetic coupler 10 about the rotational axis 64. The various magnets of the outer portion 62 of the magnetic coupler 10 define various outer magnetic fields 50 that interact with the reluctance mechanism 120 of the follower rotor 26. These magnetic fields 50 define various magnetic flux paths 124 that extend through the reluctance mechanism 120 of the follower rotor 26. These flux paths 124 align with the path of least reluctance 126 to maintain a conservation of energy within the various systems generating the plurality of outer magnetic fields 50 within the magnetic coupler 10. As exemplified in FIG. 14, the reluctance mechanism 120 of the inner portion 60 generates a plurality of paths of least reluctance 126 that are defined by a consistent rotational position of the follower rotor 26 with respect to the drive rotor 40. By aligning these paths of least reluctance 126 between the drive rotor 40 and the reluctance mechanism 120 of the follower rotor 26, the torque-retention force 100 is generated due to the tendency of the reluctance mechanism 120 to maintain the path of least reluctance 126 with respect to the outer magnetic fields 50 of the drive rotor 40. Additionally, because the drive-magnetic members 42 of the drive rotor 40 are typically maintained in the Halbach configuration 80, the outer magnetic fields 50 generated in the direction of the gap 52 and in the direction of the reluctance mechanism 120, are intensified to increase the torque-retention force 100 generated by the magnetic flux traveling through the path of least reluctance 126 within the reluctance mechanism 120.

According to various aspects of the device, the reluctance mechanism 120 can be defined within the drive rotor 40, and the magnetic features 54 in the Halbach configuration 80 can be defined by the follower magnets 70 of the follower rotor 26. The exact configuration of the drive and follower rotors 26, and the magnetic and/or reluctance mechanisms 120 contained therein can be varied depending upon the torque-requirements of the food processing appliance 12, the size of the drive system 32, and other similar configurations that may relate to torque, size, and other aspects of the device.

As exemplified in FIGS. 1-4, the base 30 of the food processing appliance 12 can include a guide structure 140 that operates to guide the container 20 and the follower rotor 26 into the generally cylindrical space 44 of the drive rotor 40. This guide structure 140 serves to align the follower rotor 26 within the drive rotor 40 to define the engaged position 46. As discussed above, the engaged position 46 of the follower rotor 26 within the drive rotor 40 maintains the consistent gap 52 between the follower magnets 70 and the drive-magnetic members 42 of the drive rotor 40. Additionally, the guide structure 140 serves to align the follower magnets 70 with the drive-magnetic members 42 to further define the engaged position 46 and maintain the gap 52, as discussed above.

Due to the non-contact configuration of the magnetic coupler 10, wear and tear within the coupler mechanism between the drive system 32 and the processing tool 18 can be minimized. Because the follower magnets 70 of the follower rotor 26 remain out of contact with the drive-magnetic members 42 of the drive rotor 40, wear and tear within these members is also minimized. While the follower magnets 70 and the drive-magnetic members 42 may remain separated, an outer structure 150 of the follower rotor 26 may rest upon a portion of the drive rotor 40 within the cylindrical space 44 defined within the drive rotor 40.

Figure 3:
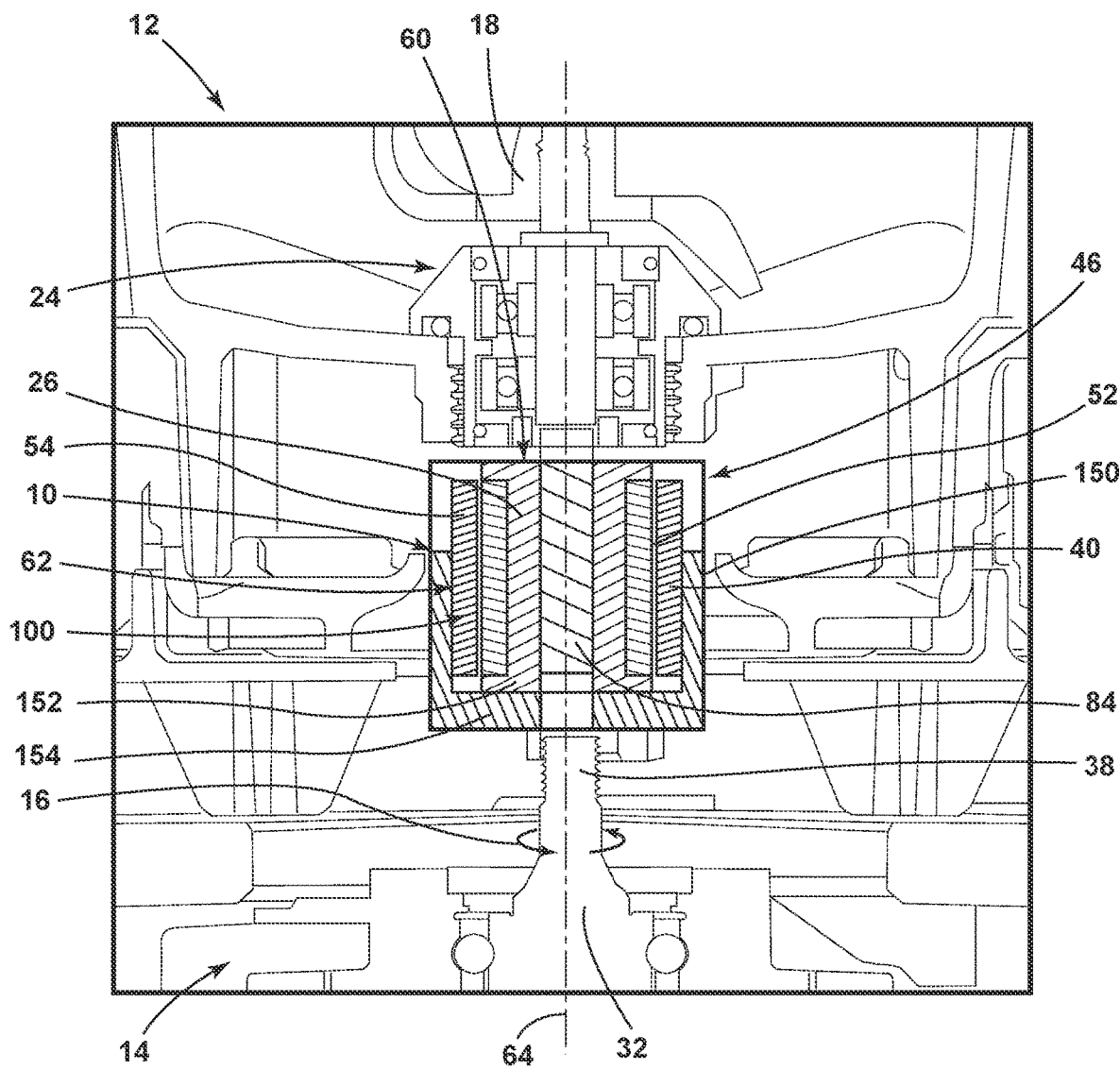
FIG. 3 is an enlarged cross-sectional view of the food processing appliance of FIG. 2 taken at area III.
Figure 4:
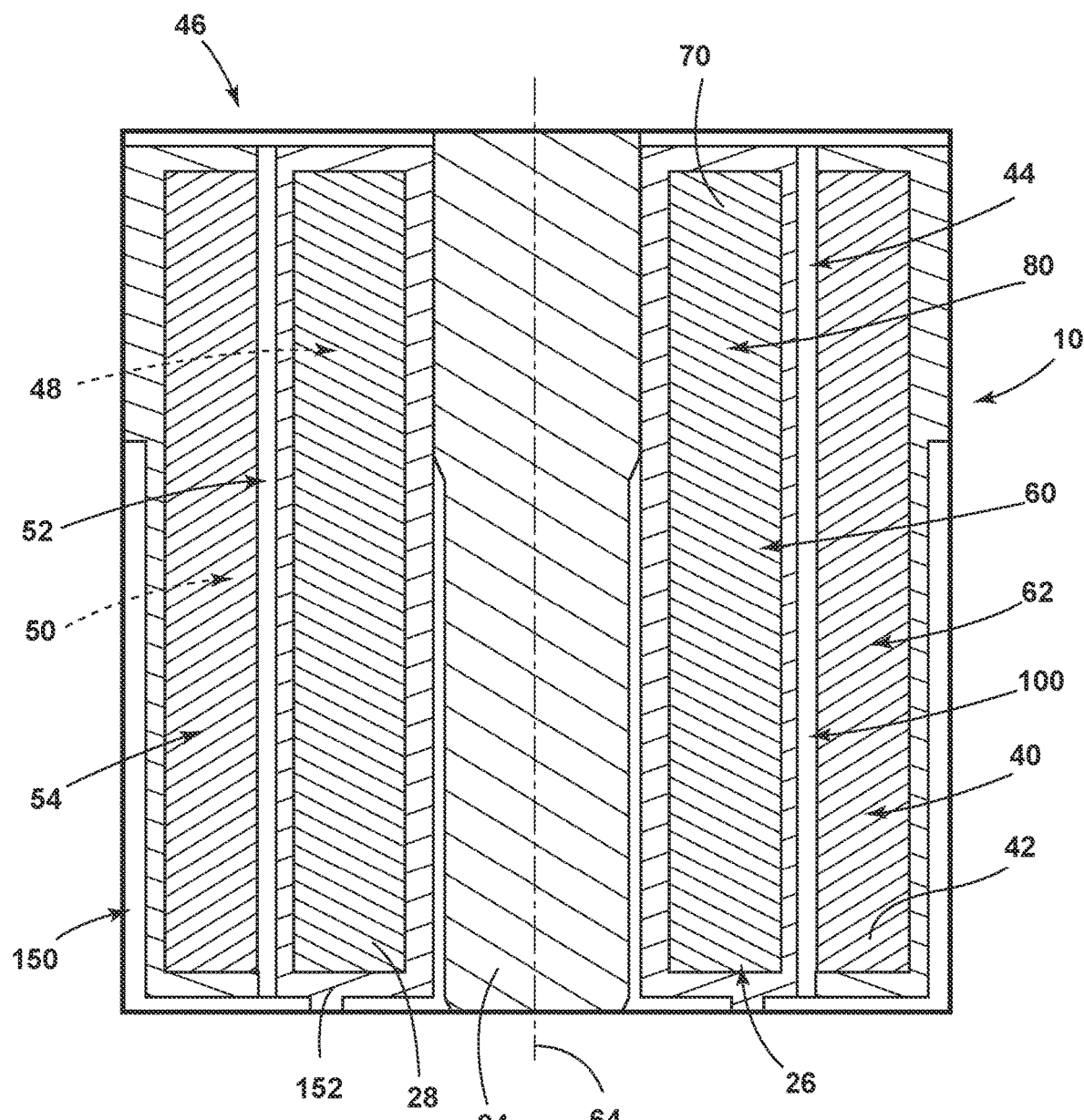
FIG. 4 is an enlarged schematic cross-sectional view of a magnetic coupler incorporated within the food processing appliance.
Figure 5:
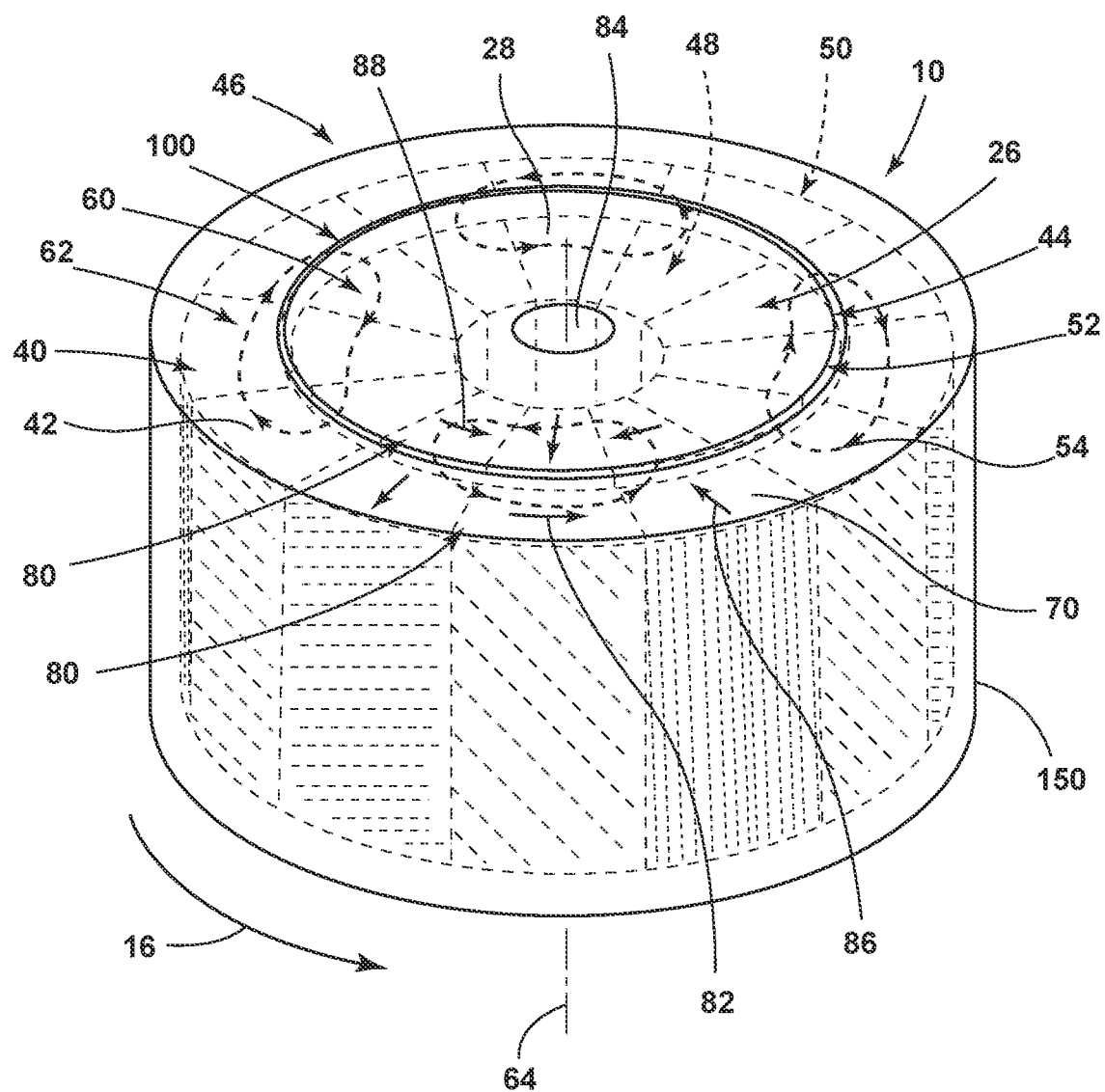
FIG. 5 is a schematic perspective view of an aspect of the magnetic coupler for the food processing appliance.

As exemplified in FIGS. 2-4, a magnet frame 152 of the follower rotor 26 is typically made of a non-magnetic material and serves to couple the follower magnets 70 with the idler shaft 84 of the processing tool 18. This magnet frame 152 may rest upon a portion of the drive coupler to help align the follower magnets 70 with the outer portion 62 of the magnetic coupler 10. Additionally, the outer coupler may include a corresponding magnet frame 154, which is also typically made of a non-magnetic material. This corresponding magnet frame 154 extends around the drive-magnetic members 42 and couples these drive-magnetic members 42 to the drive shaft 38 that extends to the rotor 36 of the SBPM motor 22. These various structural members of the inner and outer portions 60, 62 of the magnetic coupler 10 may experience some direct engagement. This direct engagement is minimal and these portions of the inner and outer portions 60, 62 of the magnetic coupler 10 are typically smooth to minimize the amount of friction and other energy loss that may be experienced within these portions of the magnetic coupler 10.

According to various aspects of the device, the number of poles or magnetic features 54 contained within the inner and outer portions 60, 62 of the magnetic coupler 10 can vary. By way of example, and not limitation, the number of poles can include six poles, eight poles, ten poles, or other similar pole configurations. According to various aspects of the device, the number of pole pairs 160 within each of the inner and outer portions 60, 62 of the magnetic coupler 10 can vary from one pole pair 160 up to 20 pole pairs 160. The number of pole pairs 160 used within a particular magnetic coupler 10 can vary the magnitude of the torque-retention force 100. Additionally, the size of the magnetic components of the magnetic coupler 10 can also vary the magnitude of the torque-retention force 100. As discussed above, the exact configuration of the components of the non-contact magnetic coupler 10 can vary depending upon the exact design of the appliance 12. It should be understood that the number of poles contained within the outer portion 62 of the magnetic coupler 10 is similar to the number of poles contained within the inner portion 60 of the magnetic coupler 10. This similarity of magnetic poles 82 helps to maximize the torque-retention force 100 generated between the inner and outer portions 60, 62 of the magnetic coupler 10. Where one of the inner and outer portions 60, 62 of the magnetic coupler 10 includes a reluctance mechanism 120, the reluctance mechanism 120, instead of having a certain number of poles, will typically have the same number of paths of least reluctance 126 as the number of poles as the opposing inner or outer portion 60, 62 of the magnetic coupler 10.

According to various aspects of the device, the gap 52 between the inner and outer portions 60, 62 of the magnetic coupler 10 can also vary. Typically, a smaller gap 52 between the inner and outer portions 60, 62 of the magnetic coupler 10 provides a greater torque-retention force 100 for aligning the follower rotor 26 with the drive rotor 40. The size of this gap 52 can be anywhere from 0.5 millimeters to approximately 5 millimeters. Various studies have shown that the gap 52 can also be 0.8 millimeters in an exemplary aspect of the device. The thicknesses of the various magnetic components of the inner and outer portions 60, 62 of the magnetic coupler 10 can also vary. Such thicknesses can include ranges of from approximately two millimeters thick to approximately 10 millimeters thick. Additionally, the overall diameter of the magnetic coupler 10 can vary the magnitude of the torque-retention force 100 of the magnetic coupler 10. Studies have shown that thicknesses of the various magnets of the inner and outer portions 60, 62 of the magnetic coupler 10 may be very thin if the outer diameter of the magnetic coupler 10 is large. Additionally, using the Halbach configuration 80 of the magnetic features 54 for the inner and outer portions 60, 62 of the magnetic coupler 10, much smaller and compact sizes of the magnetic coupler 10 may be possible. Such sizes may include from approximately 11 cubic centimeters to 80 cubic centimeters. The exact dimensions, sizes, weights and materials of the magnetic and ferromagnetic materials of the inner and outer portions 60, 62 of the magnetic coupler 10 can vary depending upon the overall design of the appliance 12 and performance-based tolerances that are required for the particular appliance 12.

The use of the magnetic coupler 10 described herein generates a significant torque-retention force 100 that can allow the SBPM motor 22 to be much smaller in size. This can be accomplished through the lack of frictional and other energy losses as a result of a magnetic coupler 10 and the contact-free configuration of the inner and outer portions 60, 62 of the magnetic coupler 10. The use of the SBPM motor 22 can extend the overall life of the appliance 12 and the use of the non-contact magnetic coupler 10 also extends the life of the processing assembly 24 for the container 20.

Figure 15:
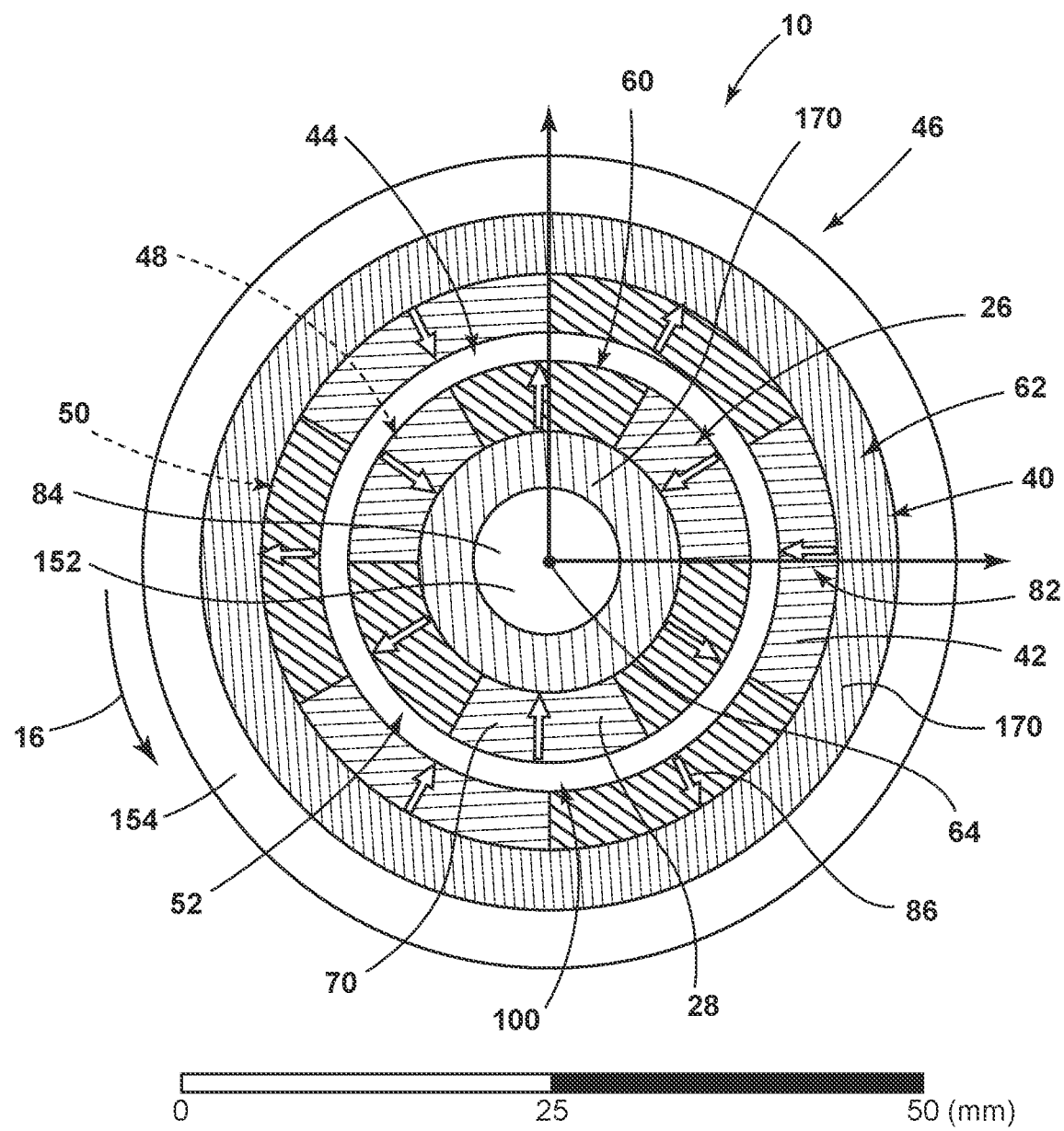
FIG. 15 is a schematic cross-sectional view of an aspect of a magnetic coupler having an alternative magnet configuration and a back iron.

Referring now to FIG. 15, the magnetic coupler 10 can include follower and drive rotors 26, 40 having radially aligned poles that are positioned in an alternating configuration. This is contrary to the Halbach configuration 80 described above. As noted previously, the Halbach configuration 80 does not require the use of a back iron 170 for directing the inner and outer magnetic fields 48, 50 toward the gap 52. In the absence of the Halbach configuration 80, the back iron 170 is necessary for achieving the same augmentation of the inner and outer magnetic fields 48, 50 to be intensified or magnified at the gap 52. Through this configuration, the drive force 16 can be transferred from the drive rotor 40 to the follower rotor 26 via the torque retention force 100 produced by the interaction of the inner and outer magnetic fields 48, 50 that are produced through the alternating and radially aligned poles 86 of the follower magnets 70 and the drive-magnetic members 42, respectively.

Figure 16:
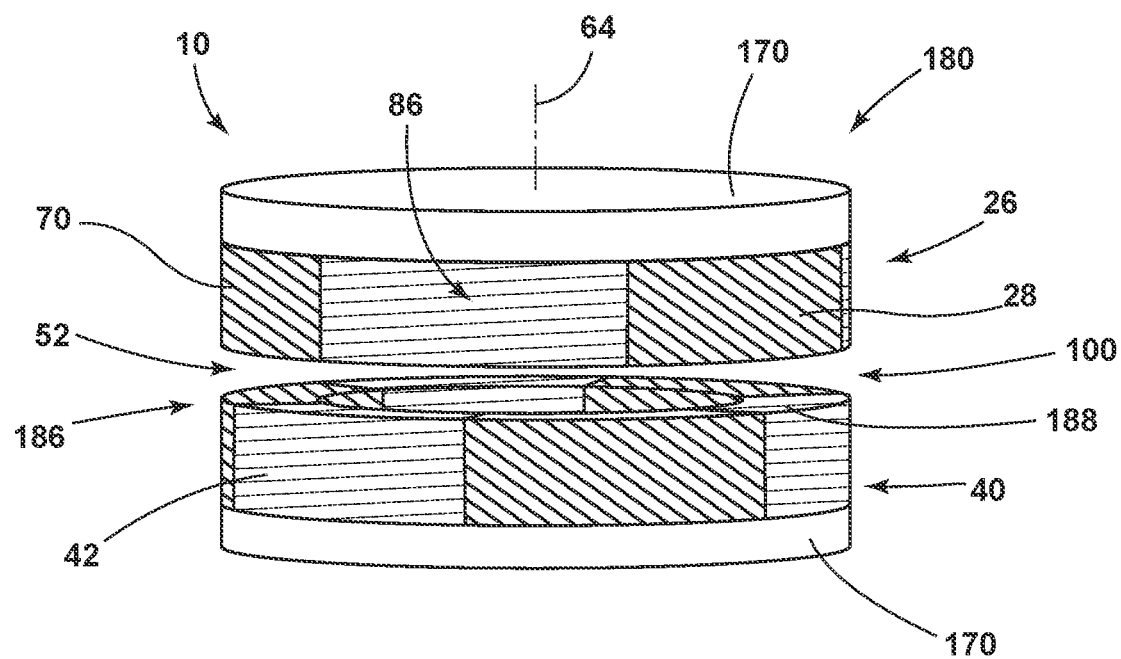
FIG. 16 is a perspective view of an aspect of a magnetic coupler with the follower and drive rotors positioned in a parallel and co-axial configuration.

Referring now to FIG. 16, the magnetic coupler 10 can be oriented in a parallel configuration 180 where the follower and drive rotors 26, 40 are oriented in a co-axial arrangement. In this parallel configuration 180, the follower rotor 26 typically has the same overall diameter as the drive rotor 40. The gap 52 is positioned between the axial ends 188 of the follower magnets 70 and the drive-magnetic members 42. This configuration of the follower and drive rotors 26, 40 produces parallel magnetic fields 186 that interact at the gap 52. In this parallel configuration of the magnetic coupler 10, the follower rotor 26 is positioned adjacent to the drive rotor 40, and not within a cylindrical space 44 as discussed in other aspects of the magnetic coupler 10. The follower magnets 70 of the follower rotor 26 and the drive-magnetic members 42 of the drive rotor 40, are typically positioned to produce radially aligned poles 86 that are alternating in configuration, similar to that shown in FIG. 15. In this configuration, the back iron 170 is necessary for each of the follower and the drive rotors 26, 40 to direct the parallel magnetic field 186 toward the gap 52. Again, this augmentation of the parallel magnetic fields 186 of the follower rotor 26 in the drive rotor 40, produces the torque-retention force 100 that maintains the radial alignment of the follower rotor 26 with respect to the drive rotor 40 during application of the drive force 16.

According to another aspect of the present disclosure, a food processing appliance includes a container having a rotational processing assembly that includes a follower rotor having a first magnetic feature. A base has a drive system for providing a rotational drive force. A magnetic coupler has a drive rotor that selectively transfers the rotational drive force to the follower rotor. The drive rotor includes a plurality of drive-magnetic members that form a generally cylindrical space that receives and surrounds the follower rotor in an engaged position. At least one of the drive and follower rotors includes a magnet configuration that directs a respective magnetic field in a direction of a gap defined between the drive and follower rotors.

According to another aspect, the magnetic feature of the follower rotor includes a plurality of follower magnets that are configured to electromagnetically interact with the plurality of drive-magnetic members.

According to yet another aspect, each of the drive and follower rotors have a plurality of permanent magnets that are oriented in a Halbach configuration. An inner magnetic field of the follower rotor and an outer magnetic field of the drive rotor are directed toward the gap.

According to another aspect of the present disclosure, each of the drive and follower rotors are free of a back iron.

According to another aspect, the drive rotor and the follower rotor are completely free of direct contact with one another in the engaged position.

According to yet another aspect, the base includes a guide structure that guides the follower rotor into the generally cylindrical space to maintain the gap between the follower and drive rotors.

According to another aspect of the present disclosure, the guide structure is adapted to align the plurality of follower magnets with the drive-magnetic members to further define the engaged position.

According to another aspect, the first magnetic feature is a reluctance mechanism.

According to yet another aspect, the drive and follower rotors are magnetically coupled with one another at the gap.

According to another aspect of the present disclosure, a food processing appliance includes a container having a rotational processing assembly that includes an inner portion of a magnetic coupler. A base has a drive system for providing a rotational drive force. A drive rotor selectively transfers the rotational drive force to the magnetic coupler. The drive rotor includes a plurality of drive-magnetic members that form an outer portion of the magnetic coupler. The inner portion and outer portions of the magnetic coupler selectively and magnetically engage to form an engaged position. The engaged position is further defined by the inner portion being completely separated from the outer portion to define a gap therebetween.

According to another aspect, the inner portion and the outer portion of the magnetic coupler define a magnetic field that is directed toward the gap in a manner that is free of a back iron.

According to yet another aspect, the outer portion of the magnetic coupler includes a plurality of permanent magnets.

According to yet another aspect, the inner portion of the magnetic coupler includes a reluctance mechanism that cooperates with the permanent magnets of the outer portion.

According to another aspect of the present disclosure, the permanent magnets are oriented in a Halbach configuration that directs the magnetic field to the gap.

According to another aspect, the outer and inner portions include at least one of bonded, sintered neodymium, ferrite, alnico and SmCo.

According to yet another aspect, the inner portion of the magnetic coupler includes a plurality of magnets that are oriented in a Halbach configuration that directs the magnetic field toward the gap.

According to another aspect of the present disclosure, a food processing appliance includes a base having a drive system for providing a rotational drive force. A drive rotor selectively transfers the rotational drive force to an outer portion of a magnetic coupler. The drive rotor includes a plurality of drive-magnetic members that form a cylindrical coupling space of the magnetic coupler. A container has a rotational processing assembly that includes an inner portion of the magnetic coupler. The inner portion selectively couples with the outer portion within the cylindrical coupling space to define an engaged position with a continuous gap extending between the inner and outer portions. The outer portion of the magnetic coupler includes a plurality of magnets that are oriented in a Halbach configuration that magnetically engages with the inner portion within the gap.

According to another aspect, the outer portion of the magnetic coupler includes a reluctance mechanism that cooperates with the plurality of magnets of the inner portion when in the engaged position.

According to yet another aspect, the outer and inner portions include at least one of bonded, sintered neodymium, ferrite, alnico and SmCo.

According to another aspect of the present disclosure, the outer portion includes a plurality of magnets that are oriented in the Halbach configuration.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A magnetic coupler for an appliance, the magnetic coupler comprising:

a follower rotor that is coupled to a food processing unit via a drive shaft, the follower rotor having a first magnetic feature and a magnet frame positioned between the first magnetic feature and the food processing unit, wherein the magnet frame extends above and below the first magnetic feature; and a drive rotor positioned at least partially within a base, the drive rotor of the base selectively receiving the follower rotor of the food processing unit in an engaged position, wherein the drive rotor selectively transfers a rotational drive force to the follower rotor and the food processing unit, wherein the food processing unit and the follower rotor are selectively removable from the base and the drive rotor, wherein the drive rotor includes a plurality of drive-magnetic members that each taper inward to form a generally cylindrical space that selectively receives and surrounds the follower rotor in the engaged position, and wherein at least one of the plurality of drive-magnetic members of the drive rotor and the first magnetic feature of the follower rotor includes a magnet configuration that directs a respective magnetic field in a direction of a continuous gap defined between the first magnetic feature and the plurality of drive-magnetic members, and wherein the first magnetic feature and the plurality of drive-magnetic members are separated from one another in the engaged position, wherein magnets of the first magnetic feature each taper inward toward an outer surface of the follower rotor that cooperates with the drive rotor to define the continuous gap, and wherein the plurality of drive-magnetic members are free of a back iron.

2. The magnetic coupler of claim 1, wherein the first magnetic feature of the follower rotor includes a plurality of follower magnets that are configured to electromagnetically interact with the plurality of drive-magnetic members, wherein an interaction of the plurality of follower magnets and the plurality of drive-magnetic members defines a plurality of magnetic fields that extends across the continuous gap and are directed away from the drive shaft of the follower rotor.

3. The magnetic coupler of claim 1, wherein each of the plurality of drive-magnetic members of the drive rotor and the first magnetic feature of the follower rotor has a plurality of permanent magnets that are oriented in a Halbach configuration, wherein an inner magnetic field of the follower rotor and an outer magnetic field of the drive rotor are directed toward the continuous gap and away from the drive shaft.

4. The magnetic coupler of claim 1, wherein the magnet configuration of each of the drive rotor and the follower rotor solely direct the respective magnetic field in the direction of the continuous gap.

5. The magnetic coupler of claim 1, wherein the first magnetic feature and the plurality of drive-magnetic members are completely free of direct contact with one another in the engaged position.

6. The magnetic coupler of claim 2, wherein the base includes a guide structure proximate the drive rotor, wherein the guide structure guides the follower rotor into the generally cylindrical space to maintain the continuous gap between the follower rotor and the drive rotor, wherein the magnet frame of the follower rotor cooperates with the guide structure to locate the follower rotor within the generally cylindrical space.

7. The magnetic coupler of claim 6, wherein the guide structure is adapted to align the plurality of follower magnets with the plurality of drive-magnetic members to further define the engaged position, and wherein a portion of the magnet frame of the follower rotor engages a corresponding magnet frame of the drive rotor, while maintaining the continuous gap between the first magnetic feature and the plurality of drive-magnetic members.

8. The magnetic coupler of claim 1, wherein the first magnetic feature is a reluctance mechanism that is made of a ferromagnetic material that defines a plurality of paths of least reluctance that cooperate with the plurality of drive-magnetic members of the drive rotor.

9. The magnetic coupler of claim 1, wherein the drive rotor and the follower rotor are magnetically coupled with one another at the continuous gap.

* * * * *